United States Patent
Zimmerman, II

(10) Patent No.: US 10,202,056 B2
(45) Date of Patent: Feb. 12, 2019

(54) SEDAN SLOUCH SEAT

(71) Applicant: Magna Seating Inc, Aurora (CA)

(72) Inventor: Ronald A Zimmerman, II, White Lake, MI (US)

(73) Assignee: Magna Seating Inc., Aurora, Ontario (CA)

( * ) Notice: Subject to any disclaimer, the term of this patent is extended or adjusted under 35 U.S.C. 154(b) by 82 days.

(21) Appl. No.: 15/036,254

(22) PCT Filed: Nov. 19, 2014

(86) PCT No.: PCT/CA2014/000839
§ 371 (c)(1),
(2) Date: May 12, 2016

(87) PCT Pub. No.: WO2015/074136
PCT Pub. Date: May 28, 2015

(65) Prior Publication Data
US 2016/0288671 A1    Oct. 6, 2016

Related U.S. Application Data

(60) Provisional application No. 61/906,143, filed on Nov. 19, 2013.

(51) Int. Cl.
*B60N 2/36* (2006.01)
*B60N 2/68* (2006.01)
(Continued)

(52) U.S. Cl.
CPC .......... *B60N 2/366* (2013.01); *B60N 2/06* (2013.01); *B60N 2/22* (2013.01); *B60N 2/2209* (2013.01);
(Continued)

(58) Field of Classification Search
CPC .......... B60N 2/366; B60N 2/986; B60N 2/06; B60N 2/2209; B60N 2/686
(Continued)

(56) References Cited

U.S. PATENT DOCUMENTS 7,229,118 B2    6/2007    Saberan et al.
7,575,281 B2    8/2009    Jeong et al.
(Continued)

FOREIGN PATENT DOCUMENTS

DE    102005024541    9/2006
KR    101406449      6/2014
WO    2008117312     10/2008

*Primary Examiner* — Anthony D Barfield
(74) *Attorney, Agent, or Firm* — Miller Canfield

(57) ABSTRACT

A seat assembly for an automotive vehicle comprises a seat cushion and a seat back pivotally coupled to the seat cushion for movement between a use position and a fold flat position overlying the seat cushion. A seat track assembly is coupled to the seat cushion for providing selective adjustment of the seat assembly between an upright design position and a reclined slouch position wherein the seat back is automatically pivoted rearwardly in response to forward sliding movement of the seat cushion. A sliding fold flat latch mechanism is operatively coupled to the seat back for slidably guiding the seat back during movement of the seat assembly between the upright design position and the reclined slouch position and for actuation between a locked condition retaining the seat back in the use position and an unlocked condition allowing pivotal movement of the seat back to the fold flat position.

14 Claims, 9 Drawing Sheets

(51) Int. Cl.
 *B60N 2/06* (2006.01)
 *B60N 2/22* (2006.01)
 *B60N 2/90* (2018.01)
(52) U.S. Cl.
 CPC .............. *B60N 2/686* (2013.01); *B60N 2/986* (2018.02); *B60N 2205/35* (2013.01)
(58) Field of Classification Search
 USPC ............................................ 297/378.13, 341
 See application file for complete search history.

(56) References Cited

U.S. PATENT DOCUMENTS

2009/0230745 A1* 9/2009 Jovicevic ............... B60N 2/366
 297/341 X
2012/0139314 A1 6/2012 Jeong et al.

* cited by examiner

SEDAN SLOUCH SEAT

RELATED APPLICATIONS

This application claims priority to and all the benefits of U.S. Provisional Application No. 61/906,143, filed Nov. 19, 2013, and entitled "Sedan Slouch Seat".

BACKGROUND OF THE INVENTION

1. Field of the Invention

The present invention relates to a seat assembly for use in an automotive vehicle. More particularly, the invention relates to a slouch seat assembly wherein the seat assembly is selectively moveable between an upright design position to a reclined slouch position and includes a seat back pivotally coupled to a seat cushion wherein the seat back may be selectively pivoted between a use seating position and a fold flat position overlying the seat cushion from either the upright design position or the reclined slouch position.

2. Description of Related Art

Automotive vehicles typically include one or more seat assemblies having a seat cushion and a seat back for supporting a passenger above a vehicle floor. Sedan type vehicles, or other vehicles having rear seating assemblies, are often fixedly secured to the vehicle floor and have limited adjustability due to the limited space within the rear compartment of the vehicle. It is commonly known for the seat back to be coupled to the seat cushion by a pivot assembly for providing selective pivotal folding of the seat back relative to the seat cushion between a use position and a fold flat position overlying the seat cushion to provide additional storage space within the vehicle rear compartment. It is also commonly known to include a recliner assembly operatively coupled between the seat back and the seat cushion to provide selective pivotal adjustment of the seat back between the use position and a rearward reclined position to provide seat occupant comfort.

However, in a sedan type vehicle, space behind the rear seat assembly is typically limited, or not available, to allow sufficient clearance for rearward pivoting and reclining of the seat back relative to the seat cushion.

It is desirable, therefore, to provide a slouch seat assembly wherein the seat assembly is selectively moveable between an upright design position and a reclined slouch position and also include a seat back pivotally coupled to a seat cushion wherein the seat back may be selectively pivoted between a use position and a fold flat position overlying the seat cushion from either the upright design position or the reclined slouch position.

SUMMARY OF THE INVENTION

According to one aspect of the invention, a seat assembly for use in an automotive vehicle is provided comprising a seat cushion adapted to be coupled to the floor of the vehicle and a seat back pivotally coupled to the seat cushion and operatively coupled to a support wall on the vehicle. A seat track assembly is operatively coupled to the seat cushion for providing selectively adjustment of the seat assembly between an upright design position and a reclined slouch position wherein the seat back is automatically pivoted rearwardly in response to forward sliding movement of the seat cushion. A sliding fold flat latch mechanism is operatively coupled to the seat back for slidably guiding the seat back during movement of the seat assembly between the upright design position and the reclined slouch position and for actuation between a locked condition retaining the seat back in a use position and an unlocked condition allowing pivotal movement of the seat back to a fold flat position, wherein the seat back is overlying the seat cushion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
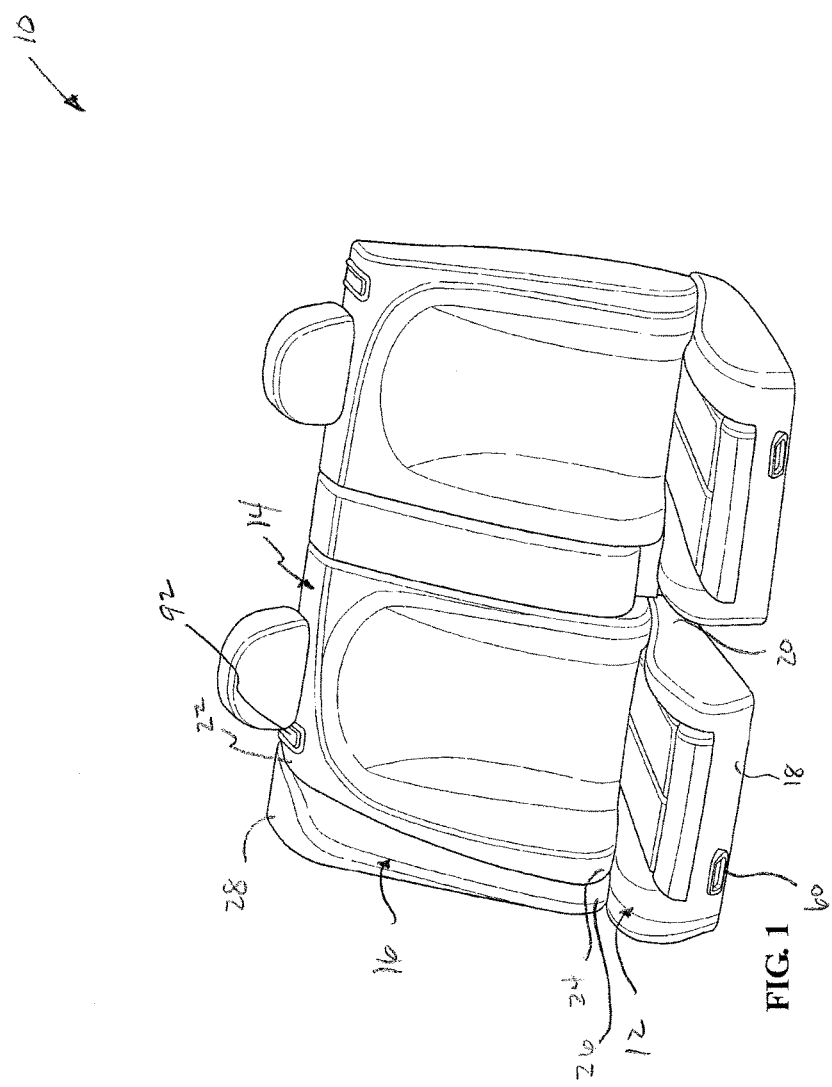
FIG. 1 is a perspective view of a pair of slouch seat assemblies for an automotive vehicle in an upright design position.

Referring to the Figures, wherein like numerals indicate like or corresponding parts throughout the several views, a sedan slouch seat assembly for use in an automotive vehicle is generally shown at 10. The Figures illustrate a dual bucket type seat arrangement having adjacent side by side bucket type seat assemblies. However, it should be appreciated that other seat arrangements are possible, such as commonly known 60/40 split type seats or bench type seats. Only one of the bucket type seat assemblies will be described in detail. It should be appreciated that each seat or type of seat assembly may operate as described herein. The seat assembly illustrated at 10 includes a generally horizontal seat cushion 12 and a generally upright seat back 14 for supporting a seat occupant as is commonly known in the art. Each of the seat cushion 12 and seat back 14 include a frame for supporting a cellular foam pad encased in a trim cover as is commonly known in the art. FIG. 1 illustrates the seat assembly 10 in an upright design position. An outboard bolster section 16 is operatively coupled adjacent the outboard side of each seat back 14. The seat cushion 12 extends between a front distal end 18 and an opposite rear end 20 adjacent the seat back 14. The seat back 14 extends between a top end 22 and an opposite bottom end 24 adjacent the rear end 20 of the seat cushion 12. Similarly, the outboard bolster section 16 extends between a lower end 26 adjacent the bottom end 24 of the seat back 14 and an upper end 28 adjacent the top end 22 of the seat back 14. The outboard bolster section 16 is generally aligned parallel with the seat back 14 when the seat assembly 10 is in the upright design position as shown in FIG. 1.

Figure 2:
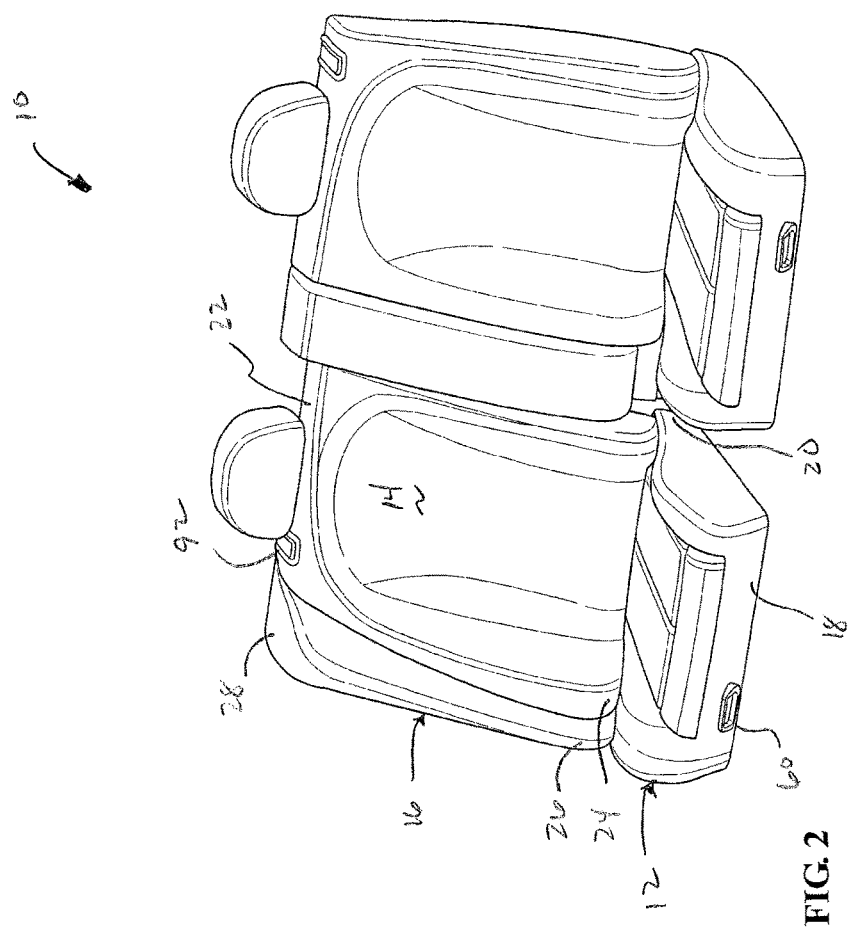
FIG. 2 is a perspective view of a slouch seat assembly in a reclined slouch position.
Figure 3:
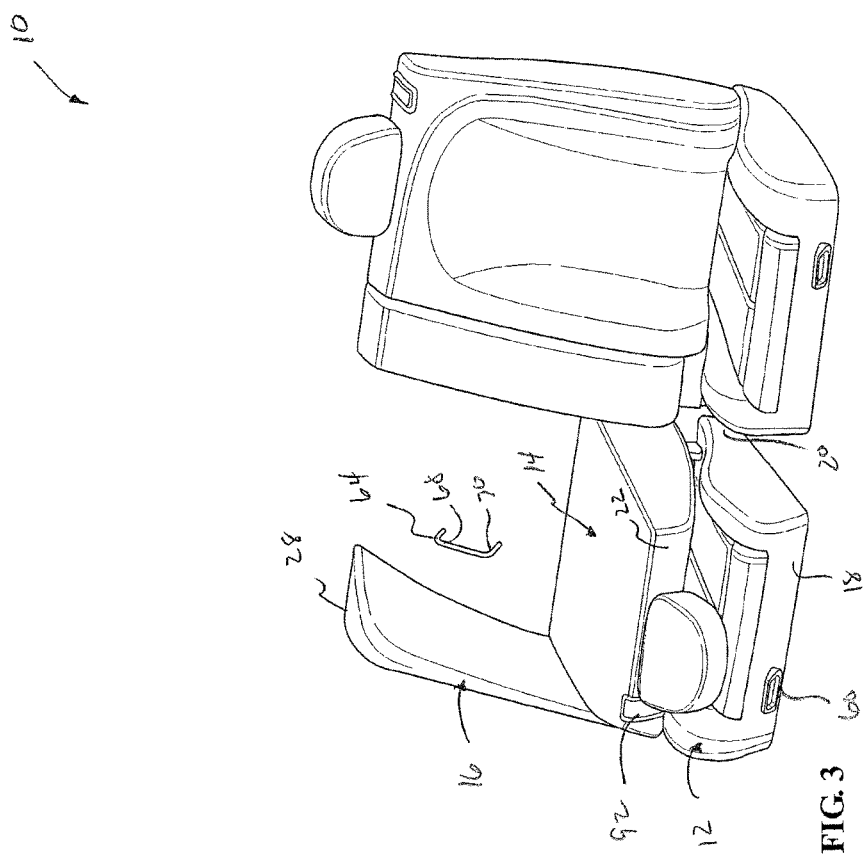
FIG. 3 is a perspective view of the slouch seat assembly in a reclined slouch position and with the seat back in a fold flat position.
Figure 4:
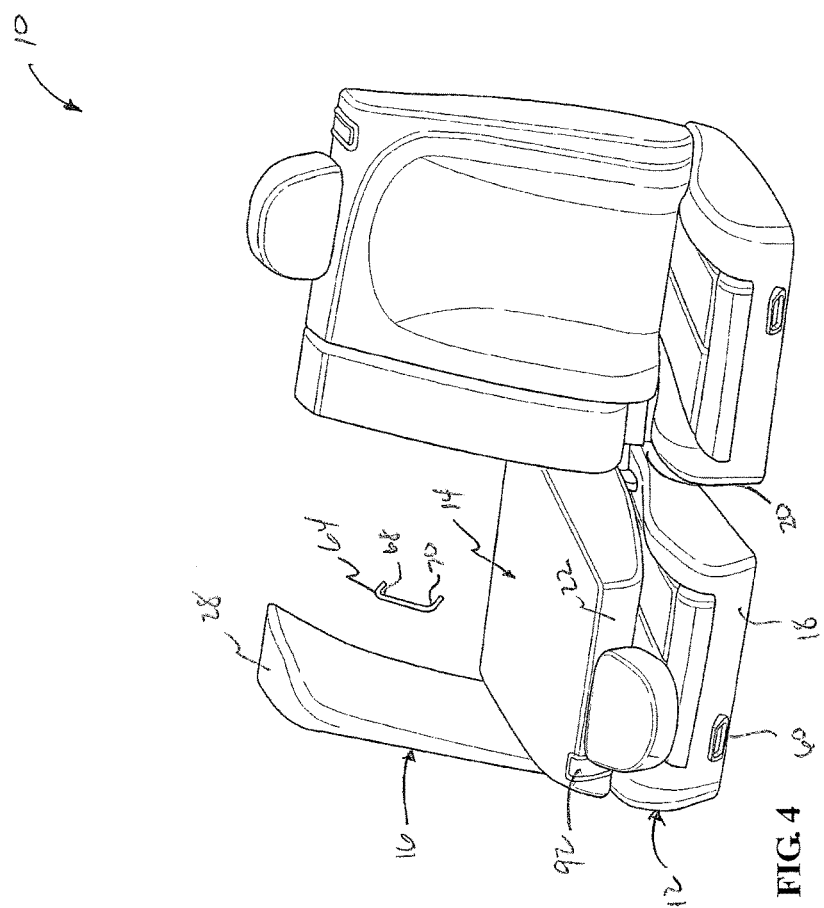
FIG. 4 is perspective view of the slouch seat assembly in the upright design position and with the seat back in the fold flat position.

Referring to FIGS. 1-4, the slouch seat assembly 10 is shown in it various selectively adjustable positions. As previously discussed, FIG. 1 illustrates the seat assembly 10 in the upright design position. FIG. 2 illustrates the seat assembly 10 in a reclined slouch position wherein the seat cushion 12 is slid or moved forwardly and the seat back 14 is partially reclined rearwardly relative to the upright design position. Also, in the reclined slouch position, the outboard bolster section 16 moves with the seat back 14 to remain substantially parallel with the seat back 14. Referring to FIG. 3, the seat assembly 10 is shown in the reclined slouch position with the seat back 14 pivoted forwardly and downwardly to a fold flat position overlying the seat cushion 12. Referring to FIG. 4, the seat assembly 10 is shown in the upright design position with the seat back 14 in the fold flat position overlying the seat cushion 12. Note that the Figures illustrate that the outboard bolster section 16 remains in the either the upright design position or reclined slouch position as the seat back 14 is pivoted to the fold flat position as will be discussed in more detail hereinbelow.

Figure 5:
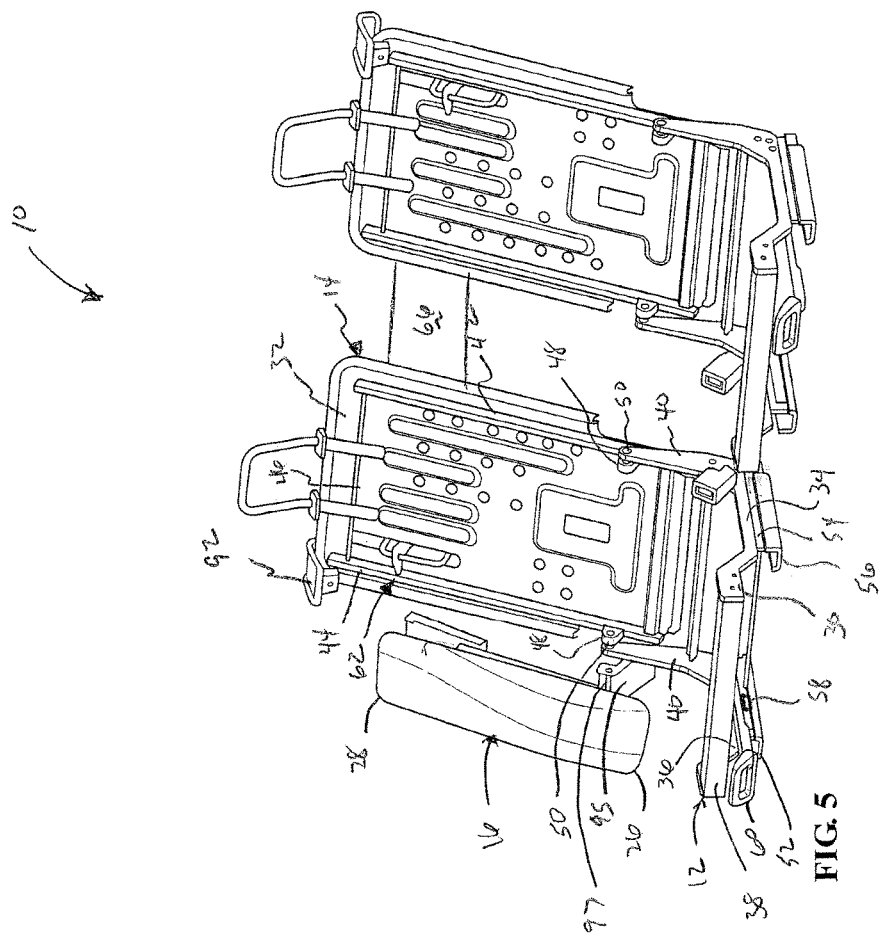
FIG. 5 is a perspective view of a side bolster operatively coupled to the slouch seat assembly and showing the seat cushion frame, seat back frame and track assembly of the slouch seat assembly in the upright design position.

Referring now to FIG. 5, the slouch seat assembly 10 is shown in the upright design position. Each of the seat cushion 12 and seat back 14 are shown with the foam pad and trim cover removed. The seat cushion 12 includes a seat cushion frame 30 and the seat back 14 includes a seat back frame 32. The seat cushion frame 30 includes spaced apart side rails 34, 36 interconnected by a front cross beam 38. A rear pivot mount 40 extends upwardly from each side rail 34, 36 adjacent the seat back frame 32. Similarly, the seat back frame 32 includes spaced apart side rails 42, 44 interconnected by a top cross beam 46. A lower pivot mount 48 extends from each side rail 42, 44 adjacent the seat cushion frame 30. Each lower pivot mount 48 and corresponding rear pivot mount 40 are pivotally interconnected by a pivot pin 50 to provide selective pivotal movement of the seat back 14 relative to the seat cushion 12 between a seating or use position, as shown in FIGS. 5 and 6, and a fold flat position overlying the seat cushion 12, as shown in FIGS. 7 and 8.

Figure 6:
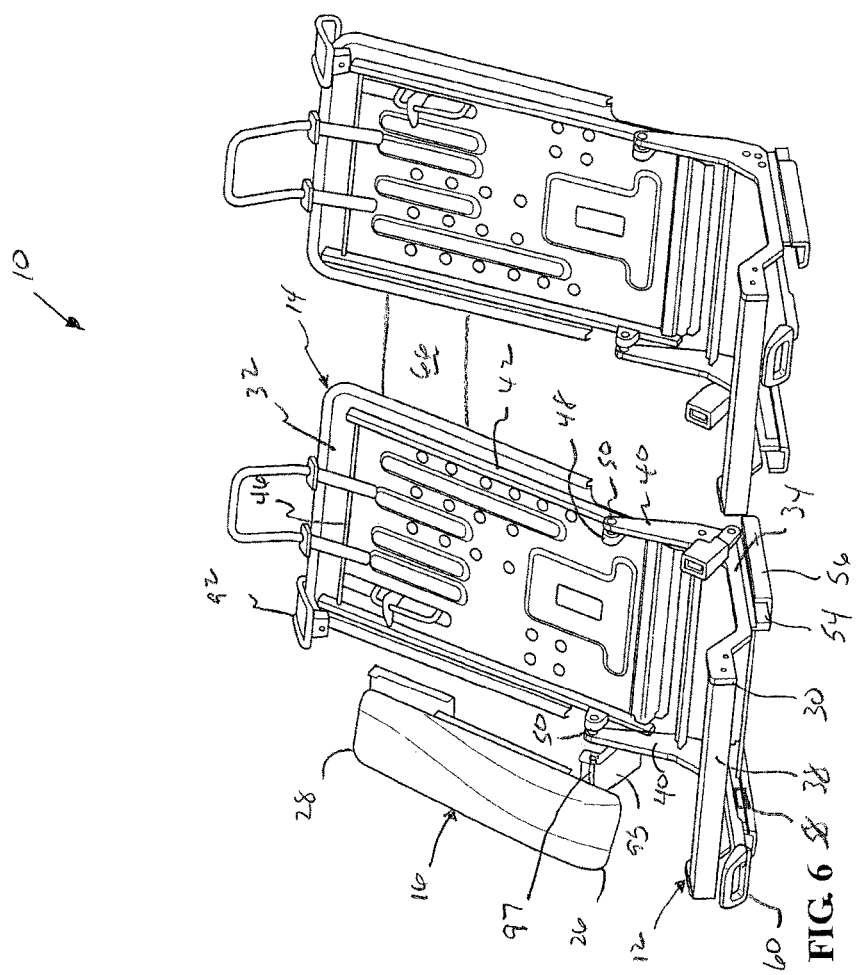
FIG. 6 is a perspective view of the side bolster, seat cushion frame, and seat back frame in the reclined slouch position.
Figure 7:
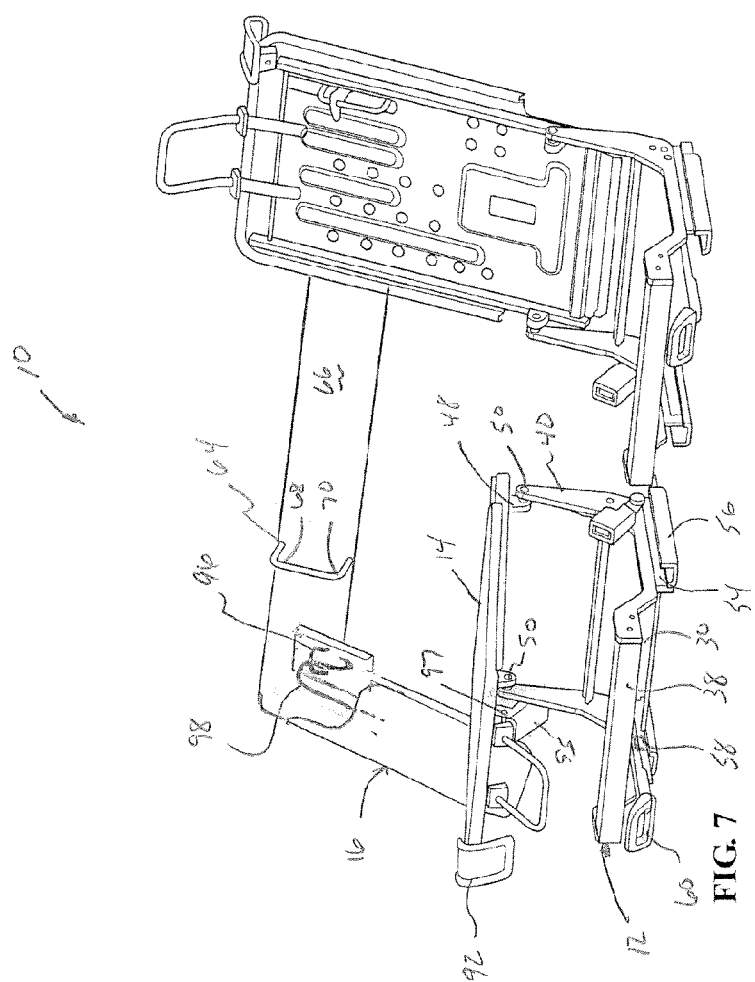
FIG. 7 is a perspective view of the side bolster in the reclined slouch position and the seat back frame in the fold flat position overlying the seat cushion frame.
Figure 8:
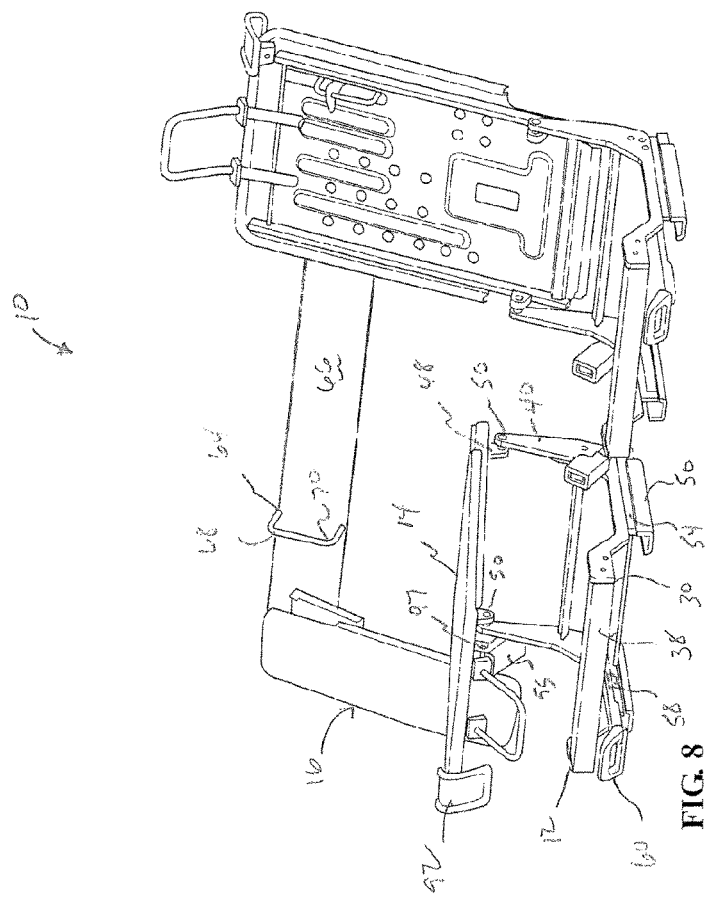
FIG. 8 is a perspective view of the side bolster in the upright design position and the seat back frame in the fold flat position overlying the seat cushion frame.

Referring to FIGS. 5-8, the seat cushion frame 30 is fixedly secured to a seat track assembly 52, as is commonly known in the art, for providing selective fore/aft sliding movement of the seat assembly 10 between the upright design position, shown in FIG. 5, and the reclined slouch position, shown in FIG. 6. The seat track assembly 52 includes a longitudinal upper track 54 slidably coupled to a parallel and longitudinal lower track 56 which is adapted to be fixedly mounted to the vehicle floor (not shown). A locking mechanism 58 is operatively coupled between the upper track 54 and lower track 56 for selectively locking and unlocking the track assembly 52 to allow the fore/aft sliding movement of the seat assembly 10 between the upright design and reclined slouch positions, as is commonly known in the art. A slouch adjuster handle 60 is operatively coupled to the locking mechanism 58 for actuating the lock mechanism 58 between locked and unlocked conditions allowing the sliding movement of the seat assembly 10. Alternatively, it should be appreciated that the seat track assembly 52 may be a power seat track assembly including an electric powered motor that is actuated electronically to drive the upper track 54 relative to the lower track 56 as is commonly known in the art.

Figure 10:
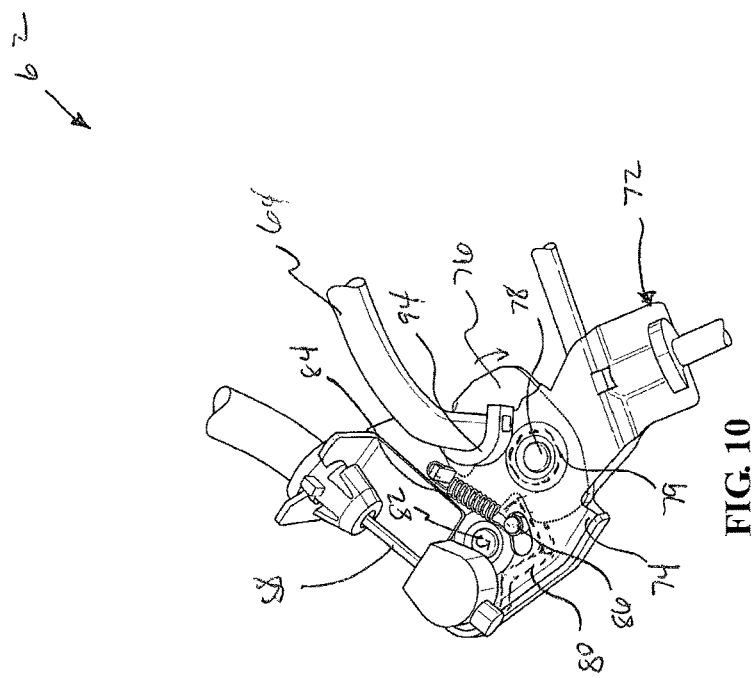
FIG. 10 is a fragmentary and partially broken perspective view of the sliding latch mechanism secured to a striker bar.
Figure 9:
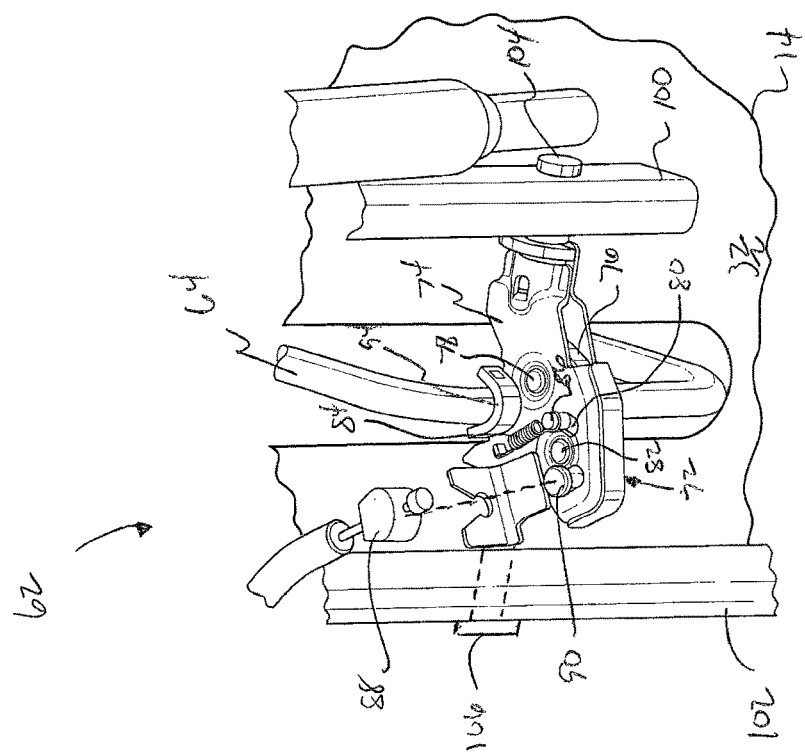
FIG. 9 is fragmentary perspective view of a sliding latch mechanism for releasably securing the seat back between a seating use position and a fold flat position.

The seat back 14 further includes a sliding fold flat latch mechanism 62 for retaining the seat back 14 in the use position upon sliding movement of the seat assembly 10 between the upright design position and reclined slouch position and for allowing selective pivotal movement of the seat back 14 between the use position and the fold flat position. More specifically, the sliding fold flat latch mechanism 62 includes a vertically elongated and generally U-shaped first striker bar 64 adapted to be fixedly mounted to a support wall 66 positioned behind the seat back 14 adjacent the top end 22 thereof. The striker bar 64 extends vertically between a first upper end 68 and a second lower end 70. A striker latch 72 is pivotally coupled to the seat back frame 32 for operative engagement with the striker bar 64. Referring to FIGS. 9 and 10, the striker latch 72 includes a support housing 74 pivotally coupled to the seat back frame 32. A latch hook 76 is pivotally coupled to the housing 74 at pivot 78 for pivotal movement between a latched condition engaged with the striker bar 64 and an unlatched condition released from the striker bar 64. A torsion spring 79 is coupled between the housing 74 and the latch hook 76 for biasing the latch hook 76 to the unlatched condition. A cam 80 is pivotally coupled to the housing 74 at pivot 82 for releasable engagement with the latch hook 76 to maintain the latch hook 76 in the sliding latched condition. A coil spring 84 extends between a post 86 on a first end of the cam 80 and the housing 74 for biasing the cam 80 into cam locking engagement with the latch hook 76. A cable 88 extends between a post 90 on a second end of the cam 80 and a fold flat release handle 92 located on the top end 22 of the seat back 14 (as shown in FIGS. 5 and 9) for actuating and releasing the cam 80 from locking engagement with the latch hook 76. Further, the housing 74 includes an arcuate collar 94 projecting therefrom for partially encircling the striker bar 64 to facilitate smooth sliding movement of the striker latch 72 along the length of the striker bar 64. The striker latch 72 is pivotally coupled to the seat back frame 32 to allow pivotal movement of the striker latch 72 in response to movement of the seat assembly 10 between the upright design position and the reclined slouch position. Specifically, referring to FIG. 9, the housing 74 is pivotally coupled between a pair of spaced apart seat back frame members 100, 102 by a respective pair of pivot posts 104, 106 to allow the striker latch 72 to pivot relative to the striker bar 64.

Finally, referring again to FIGS. 5-8, the outboard bolster section 16 is pivotally coupled to the seat cushion 12 and slidably coupled to the back support wall 66. More specifically, a support bracket 95 is connected to the rear pivot mount 40 of the seat cushion frame 30. The lower end 26 of the bolster section 16 is pivotally mounted on the support bracket 95 by pivot pin 97 so it is coaxial with pivot pin 50. A second striker bar 96 is fixedly secured to the back support wall 66 adjacent the upper end 28 of the bolster section 16 and adjacent the first striker bar 64. A striker hook 98 is fixedly secured to the back of the bolster section 16 adjacent the upper end 28 thereof for sliding engagement with the striker bar 96 to allow the bolster section 16 to move and maintain its alignment with the seat back 14 between the upright design position and reclined slouch position. However, the striker hook 98 remains hooked with the striker bar 96 and prevents pivotal folding movement of the bolster section 16 during the pivotal folding of the seat back 14 between the use position and fold flat position. Alternatively, the striker bar 96 and striker hook 98 configuration may be replaced with a pin and slot configuration without varying from the scope of the invention.

In operation, with the seat assembly 10 in the upright design position, the seat track assembly 52 is retained in a locked condition and the upper track 54 positioned full rearwardly on the lower track 56 as shown in FIG. 5. The striker latch 72 is positioned along the upper end 68 of the striker bar 64 and is in the locked condition. Further, the outboard bolster section 16 is generally aligned along the same plane as the seat back 14 while with the seat assembly 10 is in the upright design position. To selectively position the seat assembly 10 from the upright design position to the reclined slouch position, the user simply actuates the slouch adjuster handle 60 to actuate the locking mechanism 58 of the seat track assembly 52 from the locked to unlocked condition allowing sliding movement of the upper track 54 relative to the lower track 56 to a forward position, as shown in FIG. 6. In response to the seat cushion 12 sliding forwardly along the seat track assembly 52, the seat back 14 automatically pivots rearwardly via the pivot pin 50 coupled between the seat cushion frame 30 and seat back frame 32 thus defining the reclined slouch position. More specifically, the striker latch 72 is free to slide vertically along the striker bar 64 from the upper end 68 to the lower end 70 as the seat back 14 pivots and reclines in response to forward sliding movement of the seat cushion 12. Additionally, the pivot posts 104, 106 supporting the striker latch 72 to the seat back frame 32 allow the striker latch 72 to pivot relative to the fixed striker bar 64 to prevent the latch hook 76 from binding on the striker bar 64 as the angle of inclination varies between the seat back 14 and the back support wall 66. Once the seat assembly 10 is positioned in the reclined slouch position, the seat track assembly 52 is returned to the locked condition preventing further movement of the seat assembly 10. As previously discussed, the seat track assembly 52 may also be power driven to actuate the sliding movement of the seat cushion 12 between full rearward and full forward positions and thus movement of the seat assembly 10 between the upright design position and reclined slouch position. Still further, as the seat back 14 reclines rearwardly to the slouch position, the outboard bolster section 16 also reclines to maintain alignment with the seat back 14 from the upright design position to the reclined slouch position. That is, the lower end 26 of the bolster section 16 is coaxially aligned with the pivot pin 50 of the seat back 14 to freely move with the bottom end 24 of the seat back 14. The striker hook 98 on the upper end 28 of the bolster section 16 is allowed to move vertically within the striker bar 96 while maintaining its connection therewith, thus allowing the outboard bolster section 16 to travel with the seat assembly 10 between the upright design position and reclined slouch position. The seat assembly 10 may be returned from the reclined slouch position to the upright design position by again actuating the slouch adjuster handle 60 to actuate the seat track assembly 52 to the unlocked condition allowing sliding movement of the upper track 54 relative to the lower track 56. As the seat cushion 12 slides to the full rearward position, the seat back 14 automatically pivots about the pivot pin 50 and the striker latch 72 slides vertically upward along the striker bar 64 from the lower end 70 to the upper end 68 thereof to return the seat back 14 and seat assembly 10 to the upright design position as shown in FIG. 6.

Finally, the seat back 14 may be actuated between the use position, as shown in FIGS. 5 and 6, and the fold flat position overlying the seat cushion 12, as shown in FIGS. 7 and 8, while the seat assembly 10 is in either the upright design position or the reclined slouch position. In operation, the user actuates the fold flat handle 92 to actuate the striker latch 72 from the locked condition to the unlocked condition. The cable 88 rotates the cam 80 out of engagement with the latch hook 76 and the torsion spring 79 biases the latch hook 76 to rotate out of engagement with the striker bar 64 to release the striker latch 72 from engagement with the striker bar 64. Once in the unlocked condition, the seat back 14 may be freely pivoted about the pivot pin 50 between the use position and the fold flat position. Upon return of the seat back 14 to the use position, the striker latch 72 engages the striker bar 64 forcing the latch hook 76 to re-engage around the striker bar 64. The cam 80 is biased into engagement with the latch hook 76 by the coil spring 84 to retain the latch hook 76 and striker latch 72 in the latched condition and lock the seat back 14 in the use position for occupant use.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for use in an automotive vehicle, said seat assembly comprising:
   a seat cushion adapted to be coupled to the floor of the vehicle;
   a seat back pivotally coupled to said seat cushion for pivotal movement between a use position adapted to be operatively coupled to a support wall within the vehicle and a fold flat position overlying said seat cushion;
   a seat track assembly operatively coupled to said seat cushion for providing selectively adjustment of said seat assembly between an upright design position and a reclined slouch position wherein said seat back is automatically pivoted rearwardly in response to forward sliding movement of said seat cushion; and
   a sliding fold flat latch mechanism operatively coupled to said seat back for slidably guiding said seat back during movement of said seat assembly between said upright design position and said reclined slouch position and for actuation between a locked condition retaining said seat back in said use position and an unlocked condition allowing pivotal movement of said seat back to said fold flat position, said sliding fold flat latch mechanism includes a striker latch pivotally coupled to said seat back and a striker bar adapted to be fixedly secured to the support wall of the vehicle for selective locking engagement with the striker latch, said striker latch is operable between said locked condition engaged with said striker bar to maintain said seat back in said use position and said unlocked condition disengaged from said striker bar to allow pivotal movement of said seat back to said fold flat position, and wherein said striker latch includes a housing pivotally coupling said striker latch to said seat back for allowing said striker latch to pivot relative to said seat back and said striker bar during said movement of said seat assembly between said upright design position and said reclined slouch position.

2. A seat assembly as set forth in claim 1 wherein said seat track assembly includes a lower track adapted to be fixedly mounted to the floor of the vehicle and an upper track slidably coupled to said lower track for providing said adjustment of said seat assembly between said upright design position and said reclined slouch position.

3. A seat assembly as set forth in claim 2 wherein said striker latch includes a latch hook pivotally mounted to said housing for engagement with said striker bar in said locked condition, and a cam pivotally mounted to said housing for engagement with said latch hook to releasably maintain said latch hook is said locked condition.

4. A seat assembly as set forth in claim 3 wherein said striker bar extends vertically between an upper end and a lower end and wherein said striker latch slides along the vertical length of said striker bar between said upper and lower ends as said seat assembly is moved between said upright design position and said reclined slouch position while maintaining said seat back in said use position.

5. A seat assembly as set forth in claim 4 wherein said striker latch includes a coil spring coupled between said cam and said housing for biasing said cam into locking engagement with said latch hook.

6. A seat assembly as set forth in claim 5 wherein said striker latch includes a torsion spring coupled between said latch hook and said housing for biasing said latch hook toward said unlocked condition disengaged from said striker bar.

7. A seat assembly as set forth in claim 6 wherein said striker latch includes a pair of pivot posts pivotally connected between said housing and said seat back for pivotally supporting said striker latch relative to said striker bar.

8. A seat assembly as set forth in claim 7 further including a fold flat handle operatively coupled to said seat back for actuating said striker latch between said locked and unlocked condition.

9. A seat assembly as set forth in claim 8 further including a slouch adjuster handle operatively coupled to said seat track assembly for actuating said seat track assembly between said locked and unlocked condition and providing movement of said seat assembly between said upright design position and said reclined slouch position.

10. A seat assembly for use in an automotive vehicle, said seat assembly comprising:
a seat cushion adapted to be coupled to the floor of the vehicle;
a seat back pivotally coupled to said seat cushion for pivotal movement between a use position adapted to be operatively coupled to a support wall within the vehicle and a fold flat position overlying said seat cushion, said seat back extends between a top end and a bottom end, said bottom end pivotally coupled to said seat cushion by a first pivot pin;
a seat track assembly operatively coupled to said seat cushion for providing selective adjustment of said seat assembly between an upright design position and a reclined slouch position wherein said seat back is automatically pivoted rearward in response to forward sliding movement of said seat cushion;
a sliding fold flat latch mechanism operatively coupled to said seat back for slidably guiding said seat back during movement of said seat assembly between said upright design position and said reclined slouch position and for actuation between a locked condition retaining said seat back in said use position and an unlocked condition allowing pivotal movement of said seat back to said fold flat position; and
a bolster section operatively coupled to said seat cushion, wherein said bolster section remains generally aligned with said seat back during said adjustment of said seat assembly between said upright design position and said reclined slouch position, and wherein said bolster section extends between a lower end and an upper end, said bolster section including a support bracket coupled to said seat cushion and a second pivot pin pivotally coupling said lower end and said support bracket wherein said second pivot pin is coaxial with said first pivot pin of said seat back.

11. A seat assembly as set forth in claim 10 wherein said sliding fold flat latch mechanism includes a striker latch operatively coupled to said seat back and a first striker bar adapted to be fixedly secured to the support wall of the vehicle for selective locking engagement with said striker latch, wherein said striker latch is operable between said locked condition engaged with said first striker bar to maintain said seat back in said use position and said unlocked condition disengaged from said first striker bar to allow pivotal movement of said seat back to said fold flat position.

12. A seat assembly as set forth in claim 11 wherein said bolster section further includes a second striker bar adapted to be fixedly secured to the support wall and a striker hook connected to said upper end of said bolster section and slidably coupled to said second striker bar for allowing said bolster section to recline with said seat back during movement of said seat assembly between said upright design position and said reclined slouch position and maintain a generally planar alignment with said seat back.

13. A seat assembly as set forth in claim 12 wherein said striker latch includes a housing pivotally coupling said striker latch to said seat back for allowing said striker latch to pivot relative to said first striker bar, a latch hook pivotally mounted to said housing for engagement with said first striker bar in said locked condition, and a cam pivotally mounted to said housing for engagement with said latch hook to releasably maintain said latch hook is said locked condition.

14. A seat assembly as set forth in claim 13 wherein said first striker bar extends vertically between an upper end and a lower end and wherein said striker latch slides along the vertical length of said first striker bar between said upper and lower ends as said seat assembly is moved between said upright design position and said reclined slouch position while maintaining said seat back in said use position.

* * * * *